US012427784B2

(12) United States Patent
Hamano

(10) Patent No.: US 12,427,784 B2
(45) Date of Patent: Sep. 30, 2025

(54) LIQUID DROPLET EJECTION DEVICE AND LIQUID FEEDING METHOD

(71) Applicant: KONICA MINOLTA, INC., Tokyo (JP)

(72) Inventor: Hikaru Hamano, Saitama (JP)

(73) Assignee: KONICA MINOLTA, INC., Tokyo (JP)

( * ) Notice: Subject to any disclaimer, the term of this patent is extended or adjusted under 35 U.S.C. 154(b) by 182 days.

(21) Appl. No.: 18/037,239

(22) PCT Filed: Nov. 17, 2020

(86) PCT No.: PCT/JP2020/042799

§ 371 (c)(1),
(2) Date: May 16, 2023

(87) PCT Pub. No.: WO2022/107204

PCT Pub. Date: May 27, 2022

(65) Prior Publication Data

US 2023/0415489 A1 Dec. 28, 2023

(51) Int. Cl.
*B41J 2/19* (2006.01)
*B41J 2/14* (2006.01)
(Continued)

(52) U.S. Cl.
CPC ............. *B41J 2/19* (2013.01); *B41J 2/14201* (2013.01); *B41J 2/17563* (2013.01); *B41J 2/18* (2013.01)

(58) Field of Classification Search
CPC ...... B41J 2/19; B41J 2/14201; B41J 2/17563; B41J 2/18; B41J 2002/14403;
(Continued)

(56) References Cited

U.S. PATENT DOCUMENTS

2012/0038721 A1* 2/2012 Yokouchi ............. B41J 2/17509 347/93
2019/0299597 A1* 10/2019 Tsukamoto .......... B41J 2/04596

FOREIGN PATENT DOCUMENTS

JP 2005125670 A 5/2005
JP 2007168421 A 7/2007
(Continued)

OTHER PUBLICATIONS

PCT International Preliminary Report on Patentability, issued on May 16, 2023 with Written Opinion of the International Searching Authority for International Application No. PCT/JP2020/042799.
(Continued)

*Primary Examiner* — Lisa Solomon
(74) *Attorney, Agent, or Firm* — CANTOR COLBURN LLP

(57) ABSTRACT

A liquid droplet ejection device including: a liquid droplet ejection head including a nozzle, a supply channel, a discharge channel, a filter, and a communicating channel; and a liquid feeder that performs a liquid feeding operation causing the liquid in the supply channel and the discharge channel to flow in the liquid feeding direction. A mesh diameter of the filter is smaller than an aperture diameter of the nozzle, and the liquid feeder performs the liquid feeding operation in such a way that a pressure loss in the filter is smaller than a first meniscus break pressure at which a meniscus of the liquid ruptures in the filter.

5 Claims, 9 Drawing Sheets

(51) Int. Cl.
*B41J 2/175* (2006.01)
*B41J 2/18* (2006.01)

(58) Field of Classification Search
CPC .......... B41J 2002/14419; B41J 2202/12; B41J 2202/20; B41J 2/175
See application file for complete search history.

(56) References Cited

FOREIGN PATENT DOCUMENTS

| | | | |
|---|---|---|---|
| JP | 2014024320 | A | 2/2014 |
| JP | 5531872 | B2 | 6/2014 |
| JP | 6098264 | B2 | 3/2017 |
| JP | 2017081066 | A | 5/2017 |
| JP | 2018083316 | A | 5/2018 |

OTHER PUBLICATIONS

International Search Report for International Application No. PCT/JP2020/042799; Date of Mailing, Feb. 9, 2021.
JPO Notice of Reasons for Refusal for corresponding JP Application No. 2022-563272; Issued Jan. 7, 2025.

* cited by examiner

FIG.11

| | FILTER | | | | | | | NOZZLE | | FLOW RATE | | | | |
|---|---|---|---|---|---|---|---|---|---|---|---|---|---|---|
| | MESH DIAMETER ($\mu$m) | APERTURE RATIO (%) | AREA ($mm^2$) | CHANNEL RESISTANCE (×109Pa·s/$m^3$) | PRESSURE LOSS (a1) (CIRCULATION + MAX EJECTION) (kPa) | PRESSURE LOSS (a2) (MAX EJECTION) (kPa) | 1ST MB PRESSURE (b) (kPa) | APERTURE DIAMETER ($\mu$m) | 2ND MB PRESSURE (c) (kPa) | CIRCULATION FLOW RATE (ml/min) | MAX EJECTION FLOW RATE (ml/min) | CIRCULATION FLOW RATE + MAX EJECTION FLOW RATE (ml/min) | CONTINUOUS EJECTION EVALUATION RESULT (a1<b) | INTERMITTENT EJECTION EVALUATION RESULT (a2<c) |
| EXPERIMENT 1 | 20 | 30 | 100 | 2.7 | 7.6 | 3.6 | 6.0 | 40 | 3.0 | 90 | 80 | 170 | × | × |
| EXPERIMENT 2 | 20 | 30 | 200 | 1.3 | 3.8 | 1.8 | 6.0 | 40 | 3.0 | 90 | 80 | 170 | ○ | ○ |
| EXPERIMENT 3 | 20 | 30 | 300 | 0.89 | 2.5 | 1.2 | 6.0 | 40 | 3.0 | 90 | 80 | 170 | ○ | ○ |
| EXPERIMENT 4 | 20 | 30 | 400 | 0.67 | 1.9 | 0.9 | 6.0 | 40 | 3.0 | 90 | 80 | 170 | ○ | ○ |
| EXPERIMENT 5 | 10 | 40 | 100 | 8.0 | 20.0 | 8.0 | 12.0 | 20 | 6.0 | 90 | 60 | 150 | × | × |
| EXPERIMENT 6 | 10 | 40 | 200 | 4.0 | 10.0 | 4.0 | 12.0 | 20 | 6.0 | 90 | 60 | 150 | ○ | ○ |
| EXPERIMENT 7 | 10 | 40 | 400 | 2.0 | 5.0 | 2.0 | 12.0 | 20 | 6.0 | 90 | 60 | 150 | ○ | ○ |
| EXPERIMENT 8 | 10 | 20 | 100 | 16.0 | 21.3 | 16.0 | 12.0 | 20 | 6.0 | 20 | 60 | 80 | × | × |
| EXPERIMENT 9 | 10 | 20 | 200 | 8.0 | 10.7 | 8.0 | 12.0 | 20 | 6.0 | 20 | 60 | 80 | ○ | × |
| EXPERIMENT 10 | 10 | 20 | 400 | 4.0 | 5.3 | 4.0 | 12.0 | 20 | 6.0 | 20 | 60 | 80 | ○ | ○ |
| EXPERIMENT 11 | 10 | 20 | 1000 | 1.6 | 2.1 | 1.6 | 12.0 | 20 | 6.0 | 20 | 60 | 80 | ○ | ○ |

LIQUID DROPLET EJECTION DEVICE AND LIQUID FEEDING METHOD

CROSS REFERENCE TO RELATED APPLICATIONS

This is the U.S. national stage of application No. PCT/JP2020/042799, filed on Nov. 17, 2020, which is incorporated herein by reference.

TECHNICAL FIELD

The present invention relates to a liquid droplet ejection device and a liquid feeding method.

BACKGROUND ART

A conventional liquid droplet ejection device ejects a liquid such as ink from nozzles provided on a liquid droplet ejection head and causes the liquid to land at desired positions on a recording medium to form an image or the like. The liquid droplet ejection head of the liquid droplet ejection device has channels (pressure chambers) connected to the nozzles and ejects liquid droplets from the nozzles by varying the pressure of the liquid in the channels.

If gas bubbles are present in the channels, pressure is not applied normally to the liquid in the channels, resulting in poor ejection of liquid from the nozzles and degraded image quality.

To address this issue, there is a technology for suppressing the occurrence of defects caused by gas bubbles by providing a degassing device to remove gas bubbles and dissolved gases in the liquid and supplying the degassed liquid to the channels (for example, Patent Literature 1).

There is also a technology in which a degassing channel branches off partway along a channel for supplying liquid to the nozzles, and gas bubbles in the liquid are discharged from the degassing channel to the outside of the liquid droplet ejection head (for example, Patent Literature 2).

In recent years, the nozzles in liquid droplet ejection heads are increasing in number and are being driven at faster speeds in response to the desire for more high-definition images and higher productivity, and the volume of liquid droplets ejected from the nozzles has increased accordingly. In a liquid droplet ejection head with a high liquid droplet ejection volume, high channel resistance in the channel of the liquid causes large pressure variations during ejection, making stable ejection impossible. Therefore, a design that lowers the channel resistance, that is, the pressure loss in the liquid droplet ejection head, is desired.

CITATION LIST

Patent Literature

Patent Literature 1: JP 6098264B
Patent Literature 2: JP 5531872B

SUMMARY OF INVENTION

Technical Problem

However, in a configuration provided with a degassing device as in Patent Literature 1, a large pressure loss occurs because of the high channel resistance in the degassing device.

Also, in a configuration provided with a degassing channel as in Patent Literature 2, the pressure loss in the liquid droplet ejection head increases because of the need to increase the inflow volume of liquid into the liquid droplet ejection head to generate a flow that discharges gas bubbles in the degassing channel.

In this way, there is a problem with the above technologies of the related art in that it is difficult to effectively suppress the occurrence of defects caused by gas bubbles while also lessening an increase in pressure loss.

An objective of the invention is to provide a liquid droplet ejection device and a liquid feeding method that can effectively suppress the occurrence of defects caused by gas bubbles while also lessening an increase in pressure loss.

Solution to Problem

To achieve the above objective, the invention of a liquid droplet ejection device as in claim 1 is provided with:

a liquid droplet ejection head including a nozzle that ejects a liquid, a supply channel through which the liquid to be supplied to the nozzle runs, a discharge channel which communicates with the supply channel and through which the liquid to be discharged without being ejected from the nozzle runs, a filter which is provided in the supply channel and through which the liquid running through the supply channel passes, and a communicating channel that branches off from the supply channel on an upstream side of the filter in a liquid feeding direction of the liquid and communicates with the discharge channel; and a liquid feeder that performs a liquid feeding operation causing the liquid in the supply channel and the discharge channel to flow in the liquid feeding direction, wherein a mesh diameter of the filter is smaller than an aperture diameter of the nozzle, and the liquid feeder performs the liquid feeding operation in such a way that a pressure loss in the filter is smaller than a first meniscus break pressure at which a meniscus of the liquid ruptures in the filter.

According to the invention as in claim 2, in the liquid droplet ejection device as in claim 1, provided that a maximum ejection flow rate is a flow rate of the liquid in the supply channel that corresponds to a maximum ejection volume of the liquid per unit time from the nozzle, a pressure loss that occurs in the filter due to the liquid at the maximum ejection flow rate is smaller than a second meniscus break pressure at which a meniscus of the liquid ruptures in the nozzle.

According to the invention as in claim 3, in the liquid droplet ejection device as in claim 1 or 2, the supply channel has a descending portion where the liquid feeding direction has a vertically downward component, and the liquid feeder performs the liquid feeding operation in such a way that the vertically downward component of a velocity of the liquid in the descending portion is greater than a velocity at which gas bubbles smaller than the aperture diameter of the nozzle float upward by buoyant force.

According to the invention as in claim 4, in the liquid droplet ejection device as in any one of claims 1 to 3, the nozzle has a tapered part in which the cross-sectional area perpendicular to the ejection direction of the liquid decreases closer to the aperture of the nozzle.

According to the invention as in claim 5, in the liquid droplet ejection device as in any one of claims 1 to 4, the liquid is a water-based ink.

Also, to achieve the above objective, the invention of a liquid feeding method as in claim 6 is a liquid feeding method in a liquid droplet ejection device provided with a liquid ejector including a nozzle that ejects a liquid, a supply channel through which the liquid to be supplied to the nozzle runs, a discharge channel which communicates with the supply channel and through which the liquid to be discharged without being ejected from the nozzle runs, a filter which is provided in the supply channel and through which the liquid running through the supply channel passes, a communicating channel that branches off from the supply channel on an upstream side of the filter in a liquid feeding direction of the liquid and communicates with the discharge channel, in which a mesh diameter of the filter is smaller than an aperture diameter of the nozzle, the liquid feeding method comprising:

a liquid feeding step that causes the liquid in the supply channel and the discharge channel to flow in the liquid feeding direction, wherein in the liquid feeding step, the liquid is caused to flow in such a way that a pressure loss in the filter is smaller than a first meniscus break pressure at which a meniscus of the liquid ruptures in the filter.

Advantageous Effects of Invention

According to the present invention, the occurrence of defects caused by gas bubbles can be suppressed effectively while also lessening an increase in pressure loss.

BRIEF DESCRIPTION OF DRAWINGS

FIG. 11 This is a table showing the details and results of experiments for confirming the effect of an embodiment.

DESCRIPTION OF EMBODIMENTS

Hereinafter, embodiments related to the liquid droplet ejection device and the liquid feeding method of the present invention will be described on the basis of the drawings.

<Configuration of Liquid Droplet Ejection Device>

Figure 1:
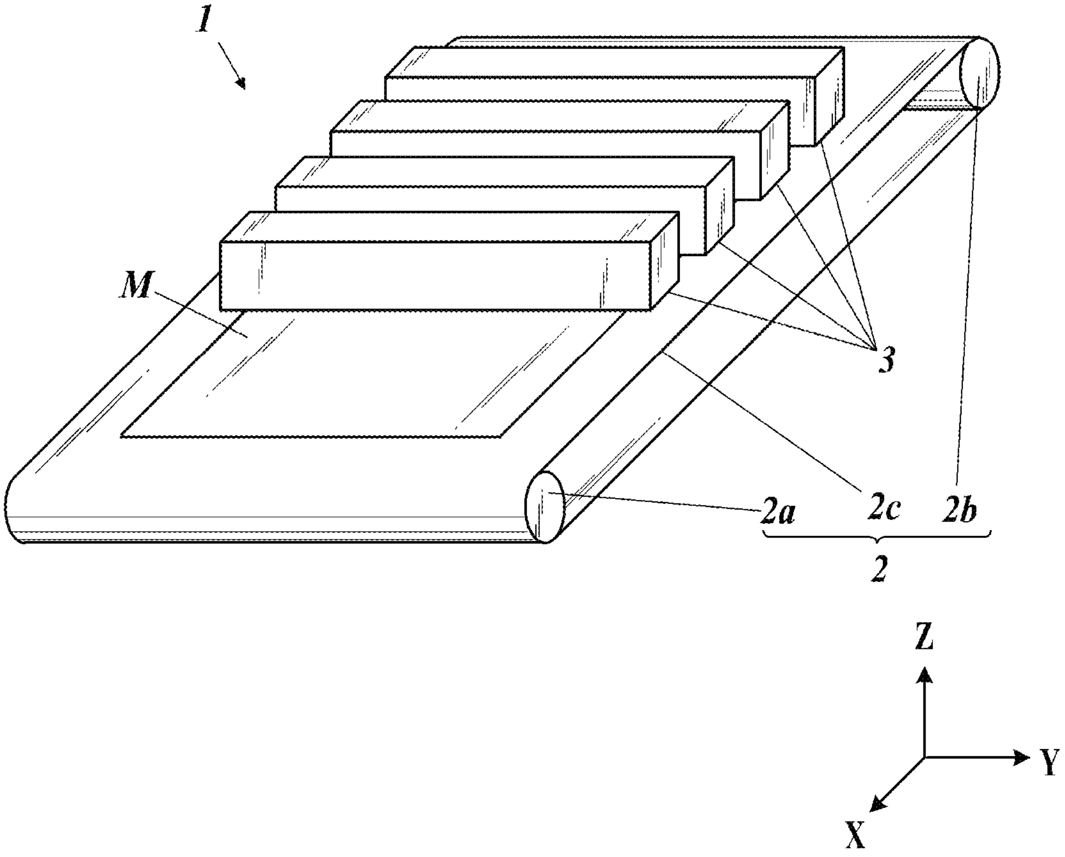
FIG. 1 This is a diagram illustrating a schematic configuration of a liquid droplet ejection device.

FIG. 1 is a diagram illustrating a schematic configuration of a liquid droplet ejection device 1.

The liquid droplet ejection device 1 is provided with, among other things, a conveyor 2 and a head unit 3. The liquid droplet ejection device 1 of the present embodiment is an inkjet recording device that ejects droplets of ink as a liquid onto a recording medium M to form an image.

The conveyor 2 is provided with two conveyor rollers 2*a*, 2*b* that rotate about an axis of rotation extending in the Y direction of FIG. 1 and a looped conveyor belt 2*c* supported on the inner side by the conveyor rollers 2*a*, 2*b*. With the recording medium M placed on the conveying surface of conveyor belt 2*c*, the conveyor 2 conveys the recording medium M in the direction of travel (conveying direction; X direction in FIG. 1) of the conveyor belt 2*c* by causing the conveyor roller 2*a* to rotate according to the operation of a conveyor motor, not illustrated, to cause the conveyor belt 2*c* to move in a loop.

The recording medium M may be a sheet of paper cut to a certain size. The recording medium M is supplied onto the conveyor belt 2*c* by a paper feeding device not illustrated, and after ink is ejected from the head unit 3 and an image is recorded, the recording medium M is delivered from the conveyor belt 2*c* into a predetermined delivery receptacle. Note that roll paper may also be used as the recording medium M. In addition, besides paper such as plain paper and coated paper, various types of media to which ink landing on the surface thereof can be fixed, such as woven fabric or sheet resin, can also be used as the recording medium M.

The head unit 3 records an image onto the recording medium M conveyed by the conveyor 2 by ejecting ink at appropriate timings on the basis of image data. In the liquid droplet ejection device 1 of the present embodiment, four head units 3 corresponding to each of the four ink colors yellow (Y), magenta (M), cyan (C), and black (K) are arranged at predetermined intervals in the order of the colors Y, M, C, K from the upstream side of the conveying direction of the recording medium M. Note that the number of head units 3 may also be three or less, or five or more.

Figure 2:
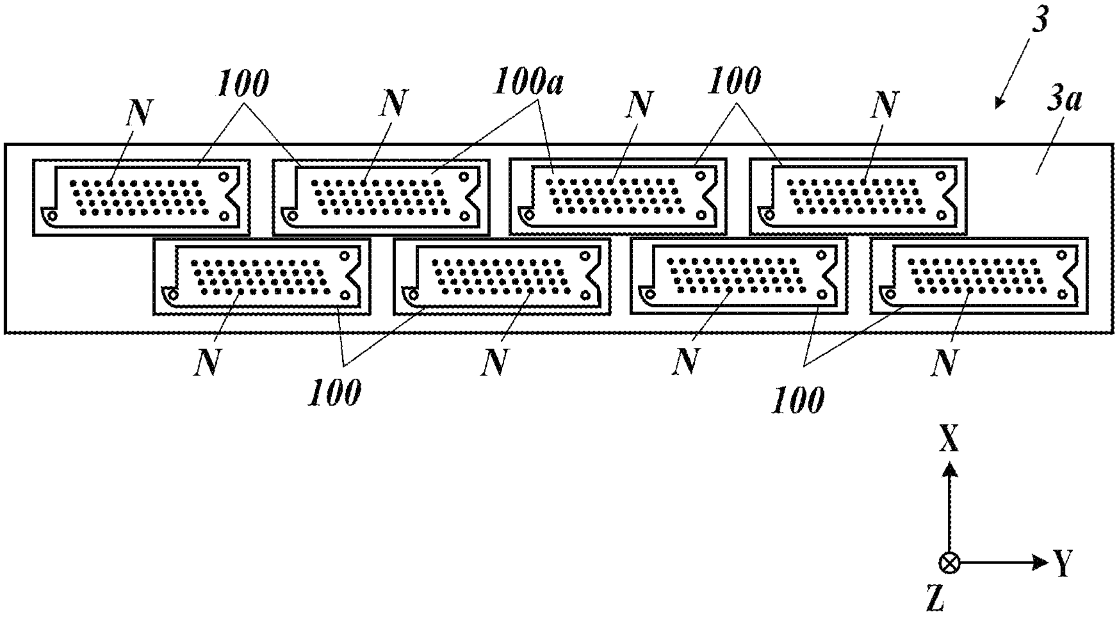
FIG. 2 This is a schematic diagram illustrating a configuration of a head unit.

FIG. 2 is a schematic diagram illustrating the configuration of the head unit 3 and is a plan view of the head unit 3 as seen from the side relative to the conveying surface of the conveyor belt 2*c*. The head unit 3 has a tabular support 3*a* and a plurality (eight in this case) of liquid droplet ejection heads 100 secured to the support 3*a* in a state of being fitted into through-holes provided in the support 3*a*. The liquid droplet ejection head 100 is secured to the support 3*a* in a state with nozzle aperture surfaces 100*a*, which is where the apertures of nozzles N are provided, exposed from the through-holes of the support 3*a* toward the −Z direction.

In the liquid droplet ejection head 100, a plurality of nozzles N are arranged at equal intervals from each other in a direction intersecting the conveying direction of the recording medium M (in the present embodiment, the lateral direction orthogonal to the conveying direction, or in other words, the Y direction). In the present embodiment, each liquid droplet ejection head 100 has four lines (nozzle lines) of nozzles N arranged one-dimensionally at equal intervals in the Y direction. These four nozzle lines are staggered from each other in the Y direction so that the positions of the nozzles N in the Y direction do not overlap. Note that the number of nozzle lines included in the liquid droplet ejection head 100 is not limited to four, and may also be three or less, or five or more.

The eight liquid droplet ejection heads 100 in the head unit 3 are arranged in a staggered grid so that the arrangement range of the nozzles N is continuous in the Y direction. The arrangement range, in the Y direction, of the nozzles N included in the head unit 3 covers the width, in the Y direction, of the available image recording area of the recording medium M conveyed by the conveyor belt 2*c*. The head unit 3 records an image with a single-pass system, in which the head unit 3 is used by being fixed in place while the image is being recorded, and ink is ejected from the nozzles N at each position at predetermined intervals (conveying direction intervals) in the conveying direction according to the conveyance of the recording medium M.

In the present embodiment, a water-based ink is used as the ink to be ejected from the liquid droplet ejection head 100. A water-based ink, for example, contains water as a dispersant and a pigment or dye as a colorant, and may also contain any of various types of water-soluble organic solvents, hydrophobic polymers, and the like.

Note that the ink to be ejected from the liquid droplet ejection head 100 is not limited to a water-based ink, and a solvent ink that uses an organic solvent as a dispersant, a UV-curing ink that is cured by UV irradiation, or the like may also be used.

Figure 3:
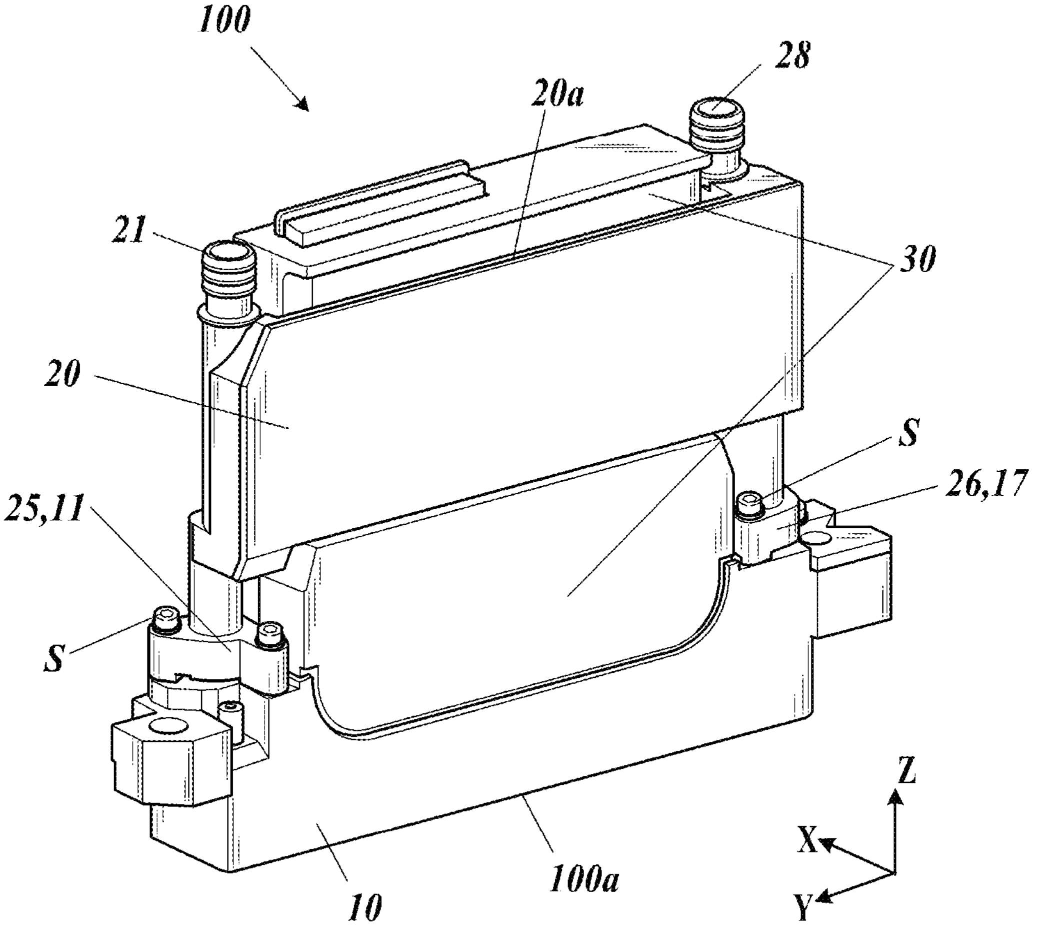
FIG. 3 This is a perspective view of a liquid droplet ejection head.

FIG. 3 is a perspective view of the liquid droplet ejection head 100.

The liquid droplet ejection head 100 is provided with, among other things, an ejection actuator 10, a liquid storage tank 20, and a cover member 30.

The ejection actuator 10 includes the nozzles N, and the bottom side (−Z direction side) is the nozzle aperture surface 100*a* where the apertures of the nozzles N are arranged. The ejection actuator 10 causes a liquid, in this case ink, supplied from the liquid storage tank 20 to be ejected from the nozzles N. Also, the ejection actuator 10 can cause the ink not ejected from the nozzles N from among the supplied ink to be discharged into the liquid storage tank 20. Furthermore, the ejection actuator 10 is provided, among other things, ink channels 151 (see FIG. 5B) connected to each nozzle N and pressure varying means for imparting a pressure variation to the ink in the ink channels 151.

The cover member 30 fits with the ejection actuator 10 and internally houses circuitry and the like for supplying a drive signal to the pressure varying means of the ejection actuator 10.

The liquid storage tank 20 is attached at a position covering a part of the outside of the cover member 30 on the opposite side (+Z direction side) from the nozzle aperture surface 100*a* side (ejection surface side) of the ejection actuator 10. The liquid storage tank 20 includes, among other things, a supply port 21 (inlet) for ink supplied from an external ink tank or the like, a main body 20*a* provided with a liquid container 23 (see FIG. 4) that contains (stores) supplied ink (liquid), an outflow port 25 that allows ink to flow into the ejection actuator 10 from the liquid container 23, an inflow port 26 through which ink discharged from the ejection actuator 10 flows in, and a discharge port 28 (outlet) through which discharged ink is discharged to the outside.

Inside the liquid storage tank 20, an ink channel which leads from the supply port 21 through the liquid container 23 to the outflow port 25 and which allows the passage of ink to be supplied to the ejection actuator 10 and an ink channel which leads from the inflow port 26 to the discharge port 28 and which allows the passage of ink to be discharged from the ejection actuator 10 are each provided. The outflow port 25 is connected to the ink inflow port 11 of the ejection actuator 10, and the inflow port 26 is connected to the ink outflow port 17 of the ejection actuator 10. This arrangement forms a continuous ink channel (liquid channel) from the supply port 21 to the discharge port 28 of the liquid storage tank 20 in the liquid droplet ejection head 100. The outflow port 25 and the inflow port 26 are provided on legs protruding out from the main body 20*a*. The liquid storage tank 20 is removably secured by screwing these legs to the ejection actuator 10 with screws S.

The liquid storage tank 20 has a shape that is long in the Y direction and thin in the X direction when viewed from the top side (the side looking down on the supply port 21 and the discharge port 28), or in other words, a plan view (as seen from the +Z direction) in this case. The supply port 21 and the discharge port 28 are located separately near both ends of the liquid storage tank 20 in the longitudinal direction (Y direction). Similarly, the outflow port 25 and the inflow port 26 are also located separately near both ends of the liquid storage tank 20 in the longitudinal direction (Y direction).

Hereinafter, the upper part or upper end means the highest position in the +Z direction (position with the largest Z coordinate). Also, the lower part or lower end means the lowest position in the +Z direction (position with the smallest Z coordinate).

Figure 4:
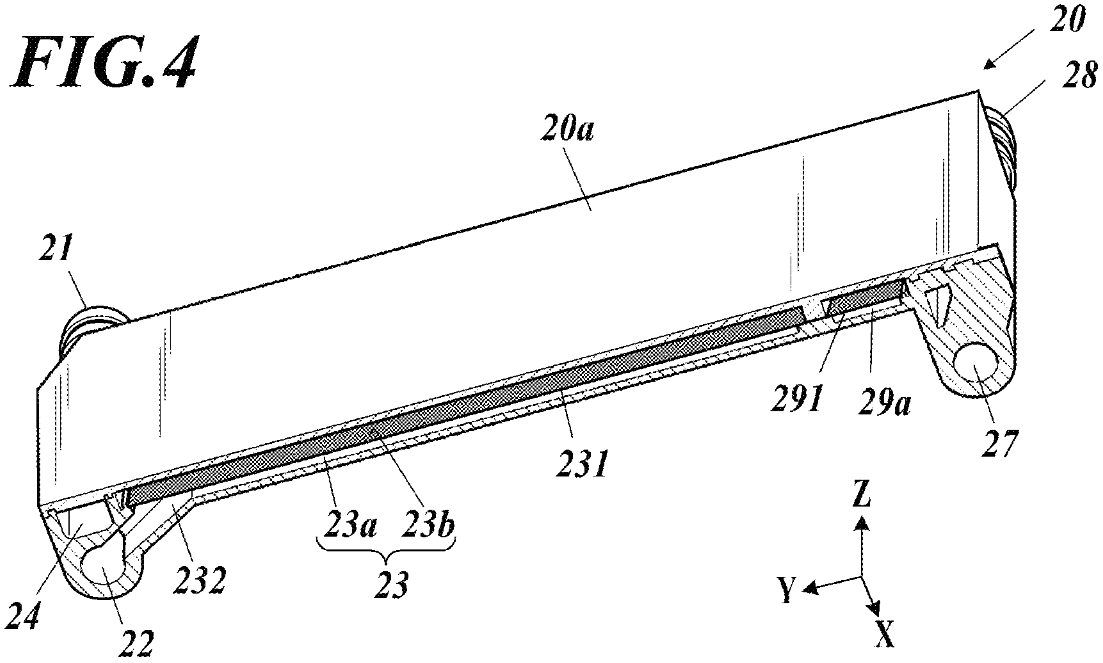
FIG. 4 This is a cross-sectional perspective view, as seen from the bottom side, of the interior of the main body of a liquid storage tank.
Figure 5A:
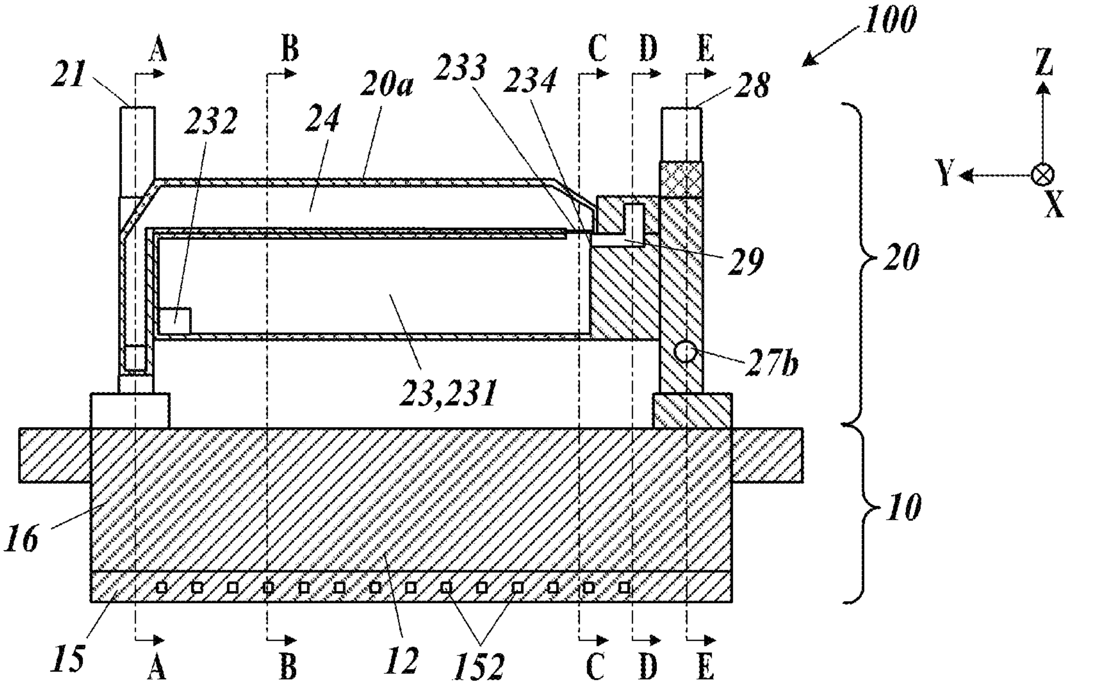
FIG. 5A This is a cross section for explaining an ink channel in a liquid droplet ejection head.
Figure 5B:
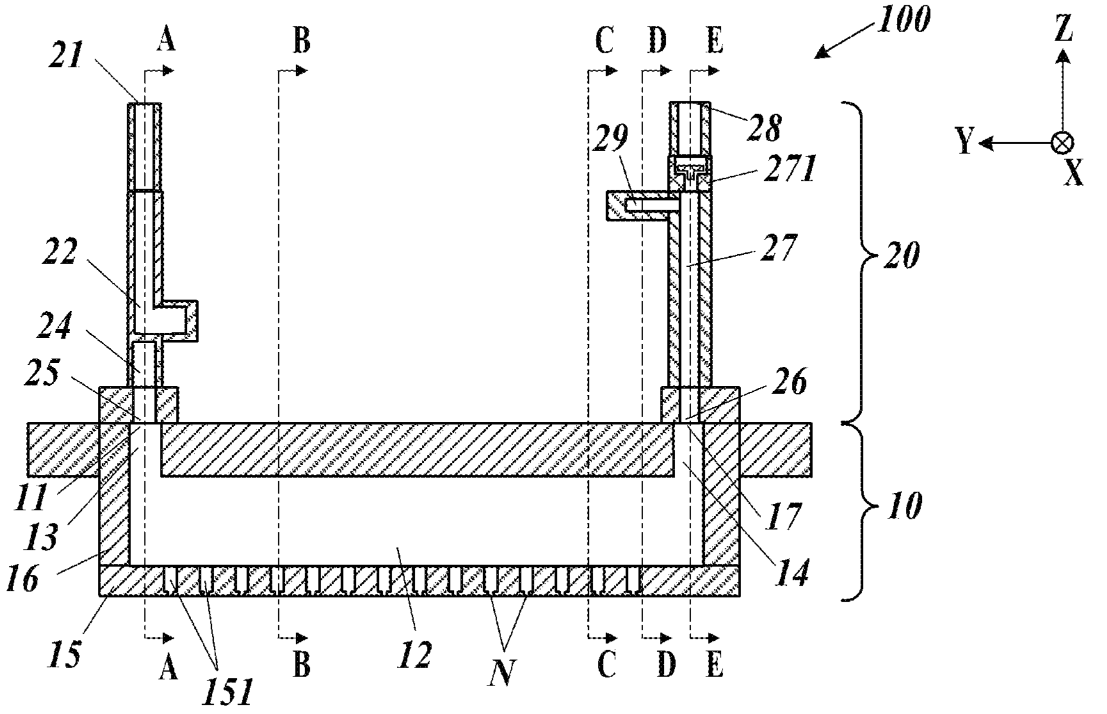
FIG. 5B This is a cross section for explaining an ink channel in a liquid droplet ejection head.
Figure 6A:
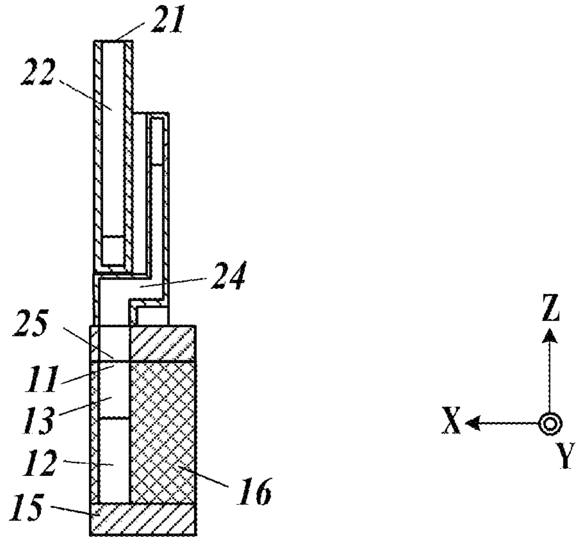
FIG. 6A This is a cross section for explaining an ink channel in a liquid droplet ejection head.

FIG. 4 is a cross-sectional perspective view, as seen from the bottom side, of the interior of the main body 20*a* of the liquid storage tank 20. Also, FIGS. 5A, FIG. 5B, FIG. 6A to FIG. 6E, and FIG. 7 are cross sections for explaining ink channels in the liquid droplet ejection head 100. FIG. 5A and FIG. 5B are cross sections in a plane parallel to the YZ plane, FIG. 5A being cut in a plane that includes the liquid container 23 (rear chamber 23*b*) and FIG. 5B being cut in a plane that includes the supply port 21, the discharge port 28, and the nozzles N. FIG. 6A to FIG. 6E are cross sections in a cutting plane parallel to the XZ plane at the positions of the cross-section lines AA to EE in each of FIG. 5A and FIG. 5B. FIG. 7 is a diagram illustrating an enlarged view of the area in the vicinity of the nozzle N in FIG. 6B.

Figure 6B:
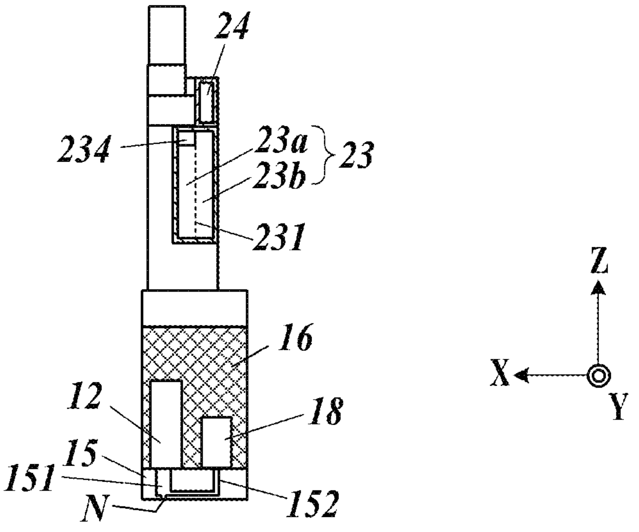
FIG. 6B This is a cross section for explaining an ink channel in a liquid droplet ejection head.
Figure 6C:
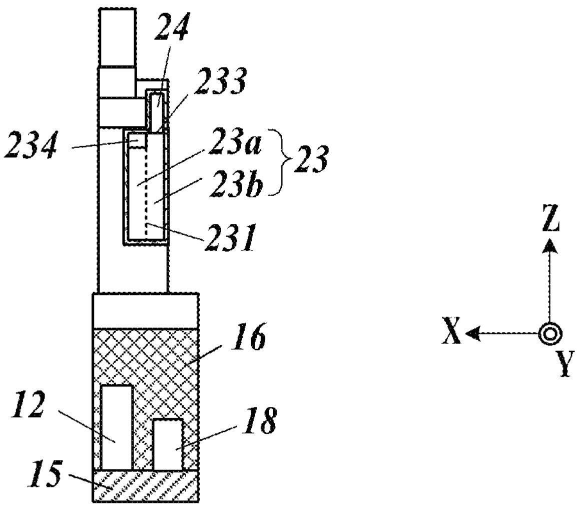
FIG. 6C This is a cross section for explaining an ink channel in a liquid droplet ejection head.
Figure 6D:
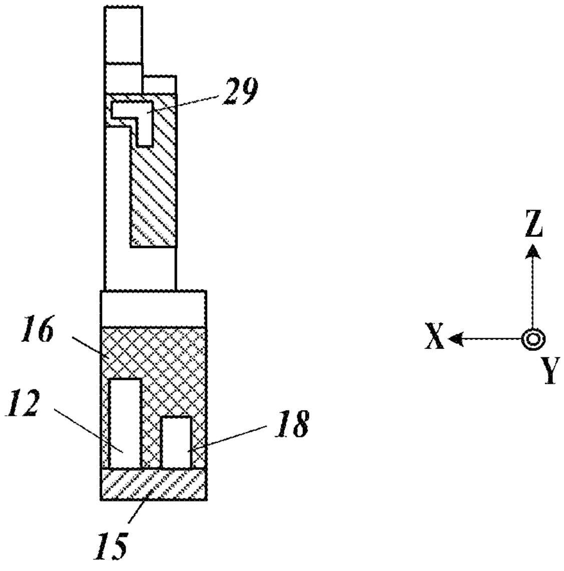
FIG. 6D This is a cross section for explaining an ink channel in a liquid droplet ejection head.
Figure 7:
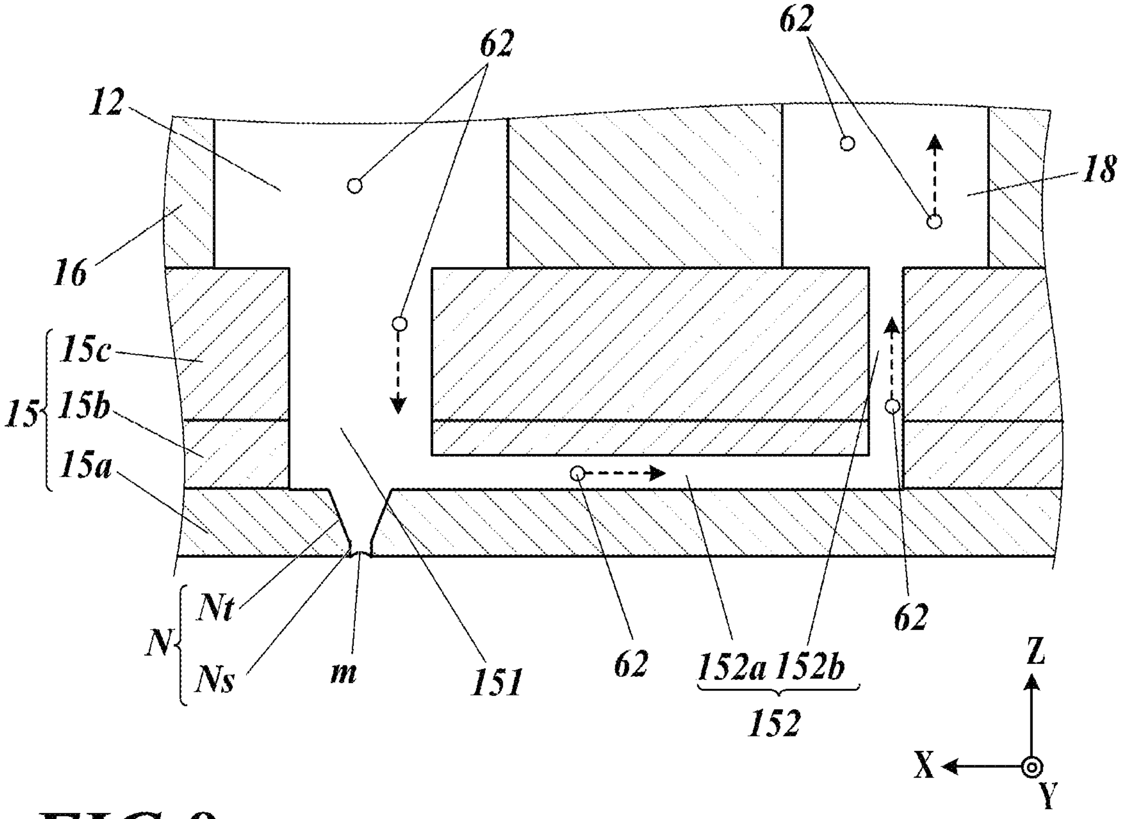
FIG. 7 This is a diagram illustrating an enlarged view of the area in the vicinity of the nozzle in FIG. 6B.

The liquid container 23 provided in the main body 20*a* of the liquid storage tank 20 and storing ink is divided into a front chamber 23*a* and a rear chamber 23*b* by an internally provided filter 231 (FIGS. 4, FIG. 6B, FIG. 6C). The filter 231 captures gas bubbles and foreign matter (impurities) in the ink flowing in from the front chamber 23*a* to the rear chamber 23*b*. Here, the filter 231 is located in a plane parallel to the YZ plane, or in other words perpendicular to the horizontal plane, and extends in the longitudinal direction.

For the filter 231, it is possible to use, for example, a structure (hereinafter referred to as a "through-hole filter") in which a tabular member of resin, metal, or the like is provided with many fine through-holes that allow the passage of ink, or a structure (hereinafter referred to as a "porous plate filter") internally having fine three-dimensional channels through which liquid can pass. Examples of porous plate filters include three-dimensionally woven fibers of metal or the like, and a porous member produced by sintering resin particles such as polyethylene resin.

In the present embodiment, a filter having a mesh diameter smaller than the aperture diameter of the nozzle N (the diameter of the circle formed by the aperture of the nozzle N) is used as the filter 231.

In the case in which the filter 231 is a through-hole filter, the mesh diameter of the filter 231 is the diameter of the through-holes.

In the case in which the filter 231 is a porous plate filter, the mesh diameter of the filter 231 is the particle size indicated as the absolute filtration rating of the filter 231 (or if not indicated, the particle size corresponding to the absolute filtration rating). Here, the absolute filtration rating is the minimum value of X that satisfies the condition that the filter 231 is capable of capturing at least 99.9% of particles of particle size X.

The supply port 21 and the front chamber 23*a* are connected by a first supply channel 22 (FIGS. 4, FIG. 5A, FIG. 5B, FIG. 6A), and ink supplied from the outside flows into the front chamber 23*a*. An open end 232 where the first supply channel 22 connects to the front chamber 23*a* is located in the lower part of the end on the side of the front chamber 23*a* near the supply port 21 in the Y direction (FIG. 4, and FIG. 5A). Also, the rear chamber 23*b* and the outflow port 25 are connected by a second supply channel 24 (FIGS. 4, FIG. 5A, FIG. 5B, FIG. 6A, FIG. 6C), and ink to be supplied to the ejection actuator 10 flows out from the rear chamber 23*b*. An open end 233 where the second supply channel 24 connects to the rear chamber 23*b* is located in the upper part of the end on the side of the rear chamber 23*b* near the discharge port 28 (discharge channel 27) in the Y direction (FIG. 5A, and FIG. 6C).

The open end 232 and the open end 233 are provided at diagonally opposite positions in the liquid container 23 (FIG. 5A). With this arrangement, ink flowing in from the open end 232 easily permeates the filter 231 over a wide area of the liquid container 23, which keeps ink from stagnating in the remaining portion. Herein, diagonally opposite positions refer to the openings being located as to include opposite vertices, and the openings may be provided in any of the three planes forming the vertices (or span more than one of the three planes).

Here, the supply port 21 and the outflow port 25 are located on the same side in the Y direction while the inflow port 26 and the discharge port 28 (discharge channel 27) are located on the opposite side (in this case, the +Y side), and the open end 233 is located on the side opposite the supply port 21 and the outflow port 25 in the Y direction (FIG. 5A, and FIG. 6B). Also, the open end 233 (connecting end to the rear chamber 23*b*) is provided across the width of the rear chamber 23*b* in the direction (X direction) perpendicular to the Y direction in the XY plane (that is, the plane parallel to the ejection surface) (FIG. 6C). The second supply channel 24 extends from the open end 233 in the Y direction above the rear chamber 23*b* (+Z direction side), then bends downward and goes under the first supply channel (−Z direction side) to lead to the outflow port 25 (FIGS. 5A, FIG. 5B, FIG. 6A). At this time, appropriate diameters are defined for the second supply channel 24 and a common ink chamber 12 to obtain a flow velocity at which gas bubbles can proceed in the direction of ink flow against the buoyant force in the portion where ink flows downward.

Figure 6E:
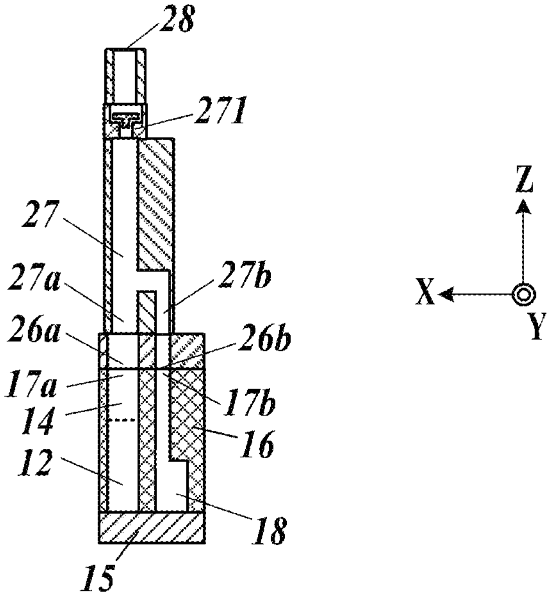
FIG. 6E This is a cross section for explaining an ink channel in a liquid droplet ejection head.

The inflow port 26 and the discharge port 28 are located on the same side in the Y direction while the supply port 21 and the outflow port 25 are located on the opposite side (in this case, the −Y side), and the inflow port 26 and the discharge port 28 are connected by the discharge channel 27 extending in the Z direction (FIGS. 5A, FIG. 5B, FIG. 6E).

Multiple, in this case two, inflow ports 26 are provided to match the multiple ink outflow ports 17*a*, 17*b* (FIG. 6E). The discharge channels 27*a*, 27*b* respectively leading to the two inflow ports 26*a*, 26*b* converge inside the liquid storage tank 20 and communicate with the single discharge port 28.

Between the discharge port 28 and the confluence of the discharge channels 27*a*, 27*b* in the discharge channel 27, a check valve 271 (FIG. 5B and FIG. 6E) is provided to prevent ink from flowing back into the ejection actuator 10 from the discharge port 28.

The front chamber 23*a* and the discharge channel 27 are connected by a communicating channel 29 (FIGS. 5A, FIG. 5B, FIG. 6C, FIG. 6D). That is, the communicating channel 29 branches off from the upstream side (front chamber 23*a*) of the filter 231 in the liquid feeding direction of ink in the liquid container 23 and communicates with the discharge channel 27. The communicating channel 29 functions as a degassing channel that guides gas bubbles (air) not passing through the filter 231 from the front chamber 23*a* to the discharge channel 27 for discharge. The communicating channel 29 extends in the −Y direction from an open end 234 of the front chamber 23*a*, and then bends in the +Z direction, the X direction, and the −Y direction in that order to reach the discharge channel 27. Here, the opening in the communicating channel 29 on the discharge channel 27 side is located between the inflow port 26 and the check valve 271. Also, the open end 234 in the communicating channel 29 on the front chamber 23*a* side is located in the upper part of the front chamber 23*a*, at the end on the side near the discharge channel 27 in the Y direction. With this arrangement, gas bubbles easily flow into the communicating channel 29 due to buoyant force.

The ejection actuator 10 is provided with an ink manifold 16 that includes the ink inflow port 11 and the ink outflow port 17 (17*a*, 17*b*), and a head chip 15 affixed to the lower surface (the surface on the −Z direction side) of the ink manifold 16 (FIG. 5A and FIG. 5B).

The ink manifold 16 is provided with the common ink chamber 12 that communicates with the ink inflow port 11 and the ink outflow port 17*a* (FIG. 5B and FIG. 6E). The common ink chamber 12 is provided extending in parallel with the nozzle aperture surface 100*a* and in the Y direction. That is, the common ink chamber 12 extends in parallel with the longitudinal direction of the liquid container 23. The ink inflow port 11 and the common ink chamber 12 are joined by a common supply channel 13, and the common ink chamber 12 and the ink outflow port 17*a* are joined by a first common discharge channel 14.

The ink manifold 16 is also provided with a second common discharge channel 18 isolated from the common ink chamber 12 (FIG. 6B to FIG. 6E, 7). The second common discharge channel 18 is provided extending in parallel with the nozzle aperture surface 100*a* and in the Y direction. That is, the second common discharge channel 18 extends in parallel with the common ink chamber 12. The second common discharge channel 18 bends in the +Z direction at the end on the ink outflow port 17 side of the ejection actuator 10 (−Y direction side), and this bent end leads to the ink outflow port 17*b* (FIG. 6E). The ink outflow port 17*b* is connected to the inflow port 26*b* described above.

The head chip 15 is provided with the nozzles N, the ink channels 151 that communicate with the nozzles N, and individual discharge channels 152 that branch off from the ink channels 151 (FIGS. 5A, FIG. 5B, FIG. 6B, FIG. 7). Hereinafter, FIG. 7 will be referenced to describe the configuration of the head chip 15.

The head chip 15 has a configuration in which a nozzle plate 15*a*, a channel substrate 15*b*, and a pressure chamber substrate 15*c* are layered in the Z direction.

The nozzle plate 15*a* is a tabular member provided with through-holes to serve as the nozzles N. The nozzle N in the present embodiment has a straight part Ns and a tapered part Nt. The straight part Ns is a portion with a cylindrical, which is to say straight, shape provided in a predetermined range in the Z direction from the aperture (ejection port) of the nozzle N. The tapered part Nt is connected to the end of the straight part Ns on the +Z direction side, and the cross-sectional area perpendicular to the ink ejection direction (Z direction) decreases closer to the aperture of the nozzle N (that is, closer to the straight part Ns).

A meniscus m (liquid surface) of ink inside the nozzle N (in this case, the straight part Ns) is slightly drawn inward into the nozzle N, or in other words, raised upward in FIG. 7. This is because the pressure inside the nozzle N is adjusted to be a slightly negative pressure relative to atmospheric pressure. This arrangement keeps ink from dripping unintentionally when ink is not being ejected. Hereinafter, the pressure obtained by subtracting the pressure inside the nozzle N from the atmospheric pressure is referred to as the meniscus pressure of the nozzle.

As the pressure inside the nozzle N is lowered, the meniscus m ruptures at a certain pressure and gas bubbles are mixed inside the nozzle N. The meniscus pressure of the nozzle when the meniscus m ruptures is referred to as the second meniscus break pressure (meniscus break pressure of the nozzle N). Provided that P2 [Pa] is the second meniscus break pressure, dn [m] is the aperture diameter of the nozzle N, and σ [N/m] is the surface tension of the ink, the relation $P2=4\sigma/dn$ holds.

The ink channels 151 and the individual discharge channels 152 are formed in the channel substrate 15*b* and the pressure chamber substrate 15*c*.

One ink channel 151 is provided with respect to one nozzle N. The ink channel 151 penetrates through the channel substrate 15*b* and the pressure chamber substrate 15*c* in the Z direction, with the upper end communicating with the lower surface of the common ink chamber 12 and the lower end communicating with one nozzle N. Ink supplied to the common ink chamber 12 is supplied to the nozzle N through this ink channel 151.

The material of the pressure chamber substrate 15*c* forming a part of the wall surface of the ink channel 151 is a ceramic piezoelectric body (a member that deforms in response to the application of a voltage). Examples of such a piezoelectric body include lead zirconate titanate (PZT), lithium niobate, barium titanate, lead titanate, and lead metaniobate. Also, the inner wall surface of the pressure chamber substrate 15*c* is provided with driving electrodes not illustrated. In response to the application of a drive signal from the circuitry described above to the drive electrode, the side walls dividing adjacent ink channels 151 undergo shear-mode displacement, which causes the pressure of the ink inside the ink channel 151 to vary. In response to this variation in pressure, the ink inside the ink channel 151 is ejected from the nozzle N. In this way, the liquid droplet ejection head 100 of the present embodiment performs shear-mode ink ejection. The side wall and driving electrodes of the ink channel 151 form the pressure varying means described above.

Note that an air chamber lacking an ink inflow channel may also be provided instead of the ink channel 151 at the formation location of every other ink channel 151 in the Y direction in FIG. 5B. By adopting such a configuration, when the partition walls of the ink channel 151 deform, it is possible to keep the deformation from affecting other ink channels 151.

The individual discharge channel 152 has a horizontal part 152*a* that branches off from the end on the nozzle N side of the ink channel 151 and extends in the −X direction, and a vertical part 152*b* that bends in the +Z direction from the end of the horizontal part 152*a* and communicates with the second common discharge channel 18. One individual discharge channel 152 is provided with respect to one ink channel 151. The horizontal part 152*a* of the individual discharge channel 152 is a trench provided in the surface on the −Z direction side of the tabular channel substrate 15*b*, and the vertical part 152*b* is a through-hole provided in the channel substrate 15*b* and the pressure chamber substrate 15*c*.

Note that the horizontal part 152*a* of the individual discharge channel 152 is not limited to being a trench provided in the channel substrate 15*b* and may also penetrate through the channel substrate 15*b* and be a trench provided in the nozzle plate 15*a*. Also, the connection location of the individual discharge channel 152 in the ink channel 151 is not limited to the end on the nozzle N side, and the individual discharge channel 152 can also be made to branch off from any location in the ink channel 151.

The individual discharge channel 152 guides, to the second common discharge channel 18, ink not discharged from the nozzle N among the ink supplied to the ink channel 151. This flow of ink causes tiny gas bubbles 62 and foreign matter inside the ink channel 151 to also be discharged to the second common discharge channel 18. The ink discharged to the second common discharge channel 18 passes through the ink outflow port 17*b*, the inflow port 26*b*, and the discharge channel 27, and is discharged from the discharge port 28.

Of the configuration of the liquid droplet ejection head 100 described above, the supply port 21, first supply channel 22, liquid container 23, second supply channel 24, common supply channel 13, common ink chamber 12, and ink channel 151 form a supply channel 101 (see FIG. 10) through which ink to be supplied to the nozzles runs. Therefore, ink running in the supply channel 101 passes through the filter 231.

Also, the first common discharge channel 14, individual discharge channel 152, second common discharge channel 18, discharge channel 27 (27*a*, 27*b*), and discharge port 28 form a discharge channel 102 (see FIG. 10) through which ink to be discharged without being ejected from the nozzles runs. The communicating channel 29 connects the supply channel 101 and the discharge channel 102.

A flow of ink leading from the supply port 21 of the liquid droplet ejection head 100, through the supply channel 101 and the discharge channel 102, to the discharge port 28 can be generated by an ink circulation mechanism 9 included in the liquid droplet ejection device 1.

Figure 8:
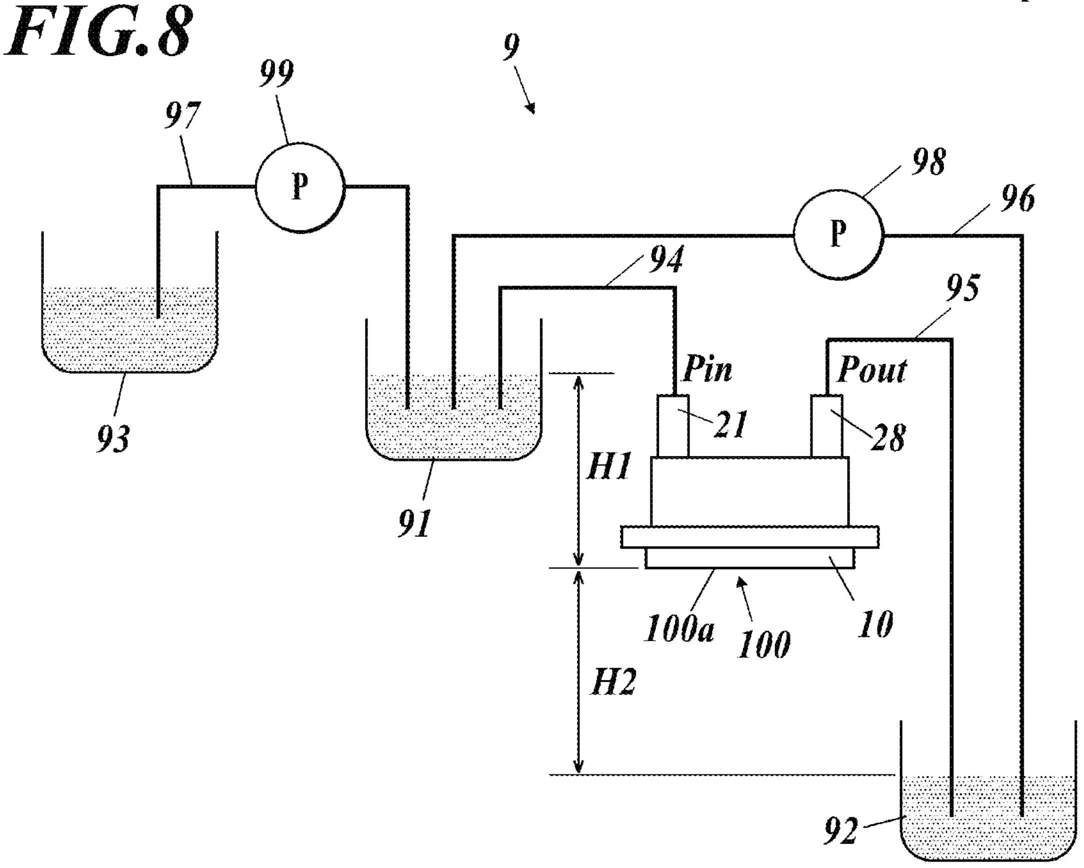
FIG. 8 This is a schematic diagram illustrating a configuration of an ink circulation mechanism.

FIG. 8 is a schematic diagram illustrating a configuration of the ink circulation mechanism 9.

The ink circulation mechanism 9 is provided with, among other things, a supply sub-tank 91, a reflux sub-tank 92, a main tank 93, ink channels 94 to 97, and pumps 98 and 99.

The supply sub-tank 91 stores ink to be supplied to the liquid droplet ejection head 100.

The supply sub-tank 91 is connected to the supply port 21 by the ink channel 94.

The reflux sub-tank 92 is connected to the discharge port 28 by the ink channel 95 and stores ink discharged from the discharge port 28.

The supply sub-tank 91 and the reflux sub-tank 92 are connected by the ink channel 96. Ink can then be returned from the reflux sub-tank 92 to the supply sub-tank 91 by the pump 98 provided in the ink channel 96.

The main tank 93 stores ink to be supplied to the supply sub-tank 91. The main tank 93 is connected to the supply sub-tank 91 by the ink channel 97. Also, ink is supplied from the main tank 93 to the supply sub-tank 91 by the pump 99 provided in the ink channel 97.

The supply sub-tank 91 is provided at a position such that the liquid surface therein is higher than the nozzle aperture surface 100*a* of the ejection actuator 10 by a height H1. Also, the reflux sub-tank 92 is provided at a position such that the liquid surface therein is lower than the nozzle aperture surface 100*a* by a height H2. With this arrangement, when the pressure inside the nozzle N (≈atmospheric pressure) is taken to be a reference pressure, the pressure at the supply port 21 is a positive pressure Pin relative to the reference pressure due to the hydraulic head differential, and the pressure at the discharge port 28 is a negative pressure Pout relative to the reference pressure due to the hydraulic head differential. This pressure difference between the pressure Pin and the pressure Pout generates a flow of ink from the supply port 21, through the supply channel 101 and the discharge channel 102, to the discharge port 28. By changing the position of the liquid surface in each sub-tank, the pressure Pin and the pressure Pout can be adjusted, and therefore the ink flow rate can be adjusted.

The ink circulation mechanism 9 corresponds to a "liquid feeder". Also, the operation by the ink circulation mechanism 9 for circulating ink through the supply channel 101 and the discharge channel 102 corresponds to a "liquid feeding operation". Here, the liquid feeding operation includes the ink pumping operations by the pumps 98 and 99.

Figure 9:
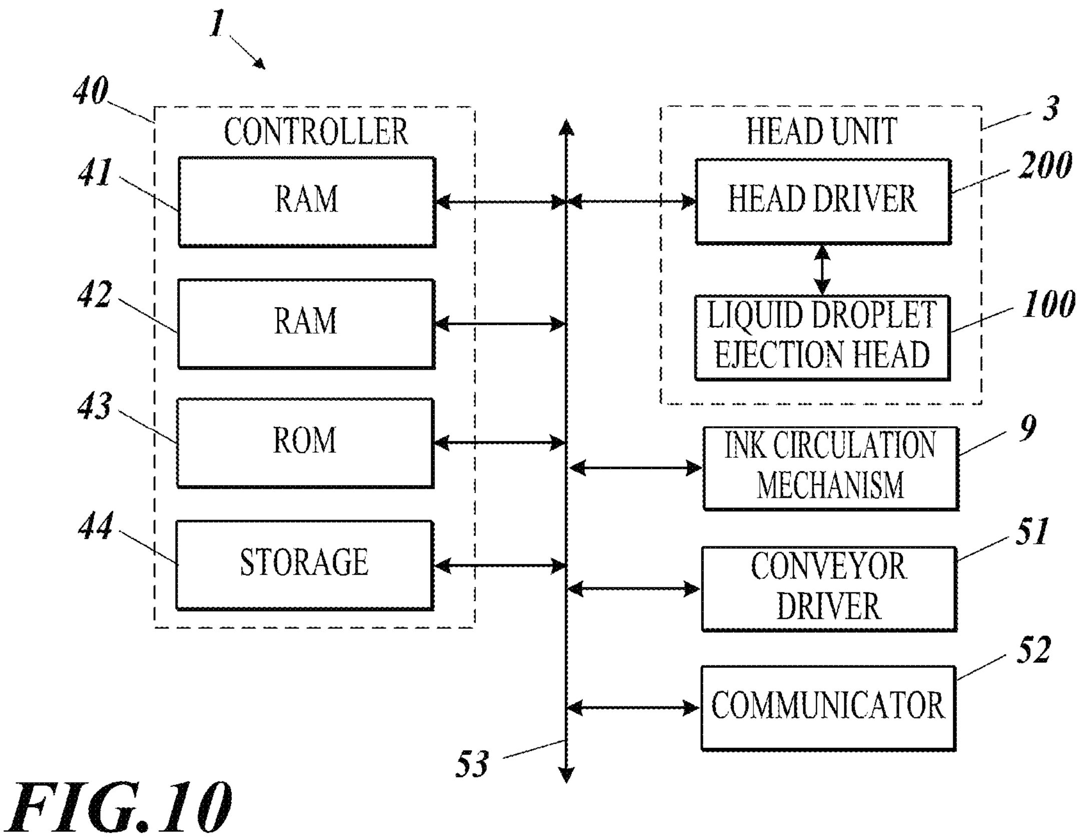
FIG. 9 This is a block diagram illustrating a main functional configuration of a liquid droplet ejection device.

FIG. 9 is a block diagram illustrating a main functional configuration of the liquid droplet ejection device 1.

The liquid droplet ejection device 1 is provided with, among other things, the head unit 3 described above, a controller 40, a conveyor driver 51, and a communicator 52, these being interconnected by a bus 53. Of these, the head unit 3 includes ahead driver 200 and the liquid droplet ejection head 100. Also, the controller 40 includes a central processing unit (CPU) 41, random access memory (RAM) 42, read-only memory (ROM) 43, and storage 44.

The CPU 41 reads out programs and settings data for various types of control stored in the ROM 43, stores the programs and data in the RAM 42, and executes the programs to perform various types of computational processing. Additionally, the CPU 41 centrally controls the operations of the liquid droplet ejection device 1 as a whole.

The RAM 42 provides a memory workspace to the CPU 41 and stores temporary data. The RAM 42 may also include non-volatile memory.

The ROM 43 stores, among other things, programs and settings data for various types of control to be executed by the CPU 41. Note that rewritable non-volatile memory such as electrically erasable programmable read-only memory (EEPROM) or flash memory may also be used in place of the ROM 43.

In the storage 44, a print job and image data related to the print job which are inputted from an external device via the communicator 52 are stored. A hard disk drive (HDD) or the like is used as the storage 44, for example.

The head driver 200 provides various controls signals and image data to the circuitry of the liquid droplet ejection head 100 at appropriate timings, on the basis of a control signal from the controller 40.

The ink circulation mechanism 9 performs the liquid feeding operation described above by operating the pumps 98 and 99 on the basis of a control signal from the controller 40.

The conveyor driver 51 supplies, on the basis of a control signal supplied from the CPU 41, a drive signal to the motor that drives the conveyor rollers 2*a*, 2*b* of the conveyor 2, thereby rotating the conveyor rollers 2*a*, 2*b* at a prescribed speed and timings to move the conveyor belt 2*c* in a loop.

The communicator 52 is a communication interface that controls communication operations with external equipment. The communication interface includes one or more LAN boards or LAN cards, for example, that support various communication protocols. The communicator 52 acquires image data to be recorded and settings data (job data) related to image recording from an external device on the basis of control by the controller 40 and transmits status information and the like to external equipment.

<Operations of Liquid Droplet Ejection Device>

Next, the operations of the liquid droplet ejection device 1 will be explained, with focus on operations related to ink circulation.

Figure 10:
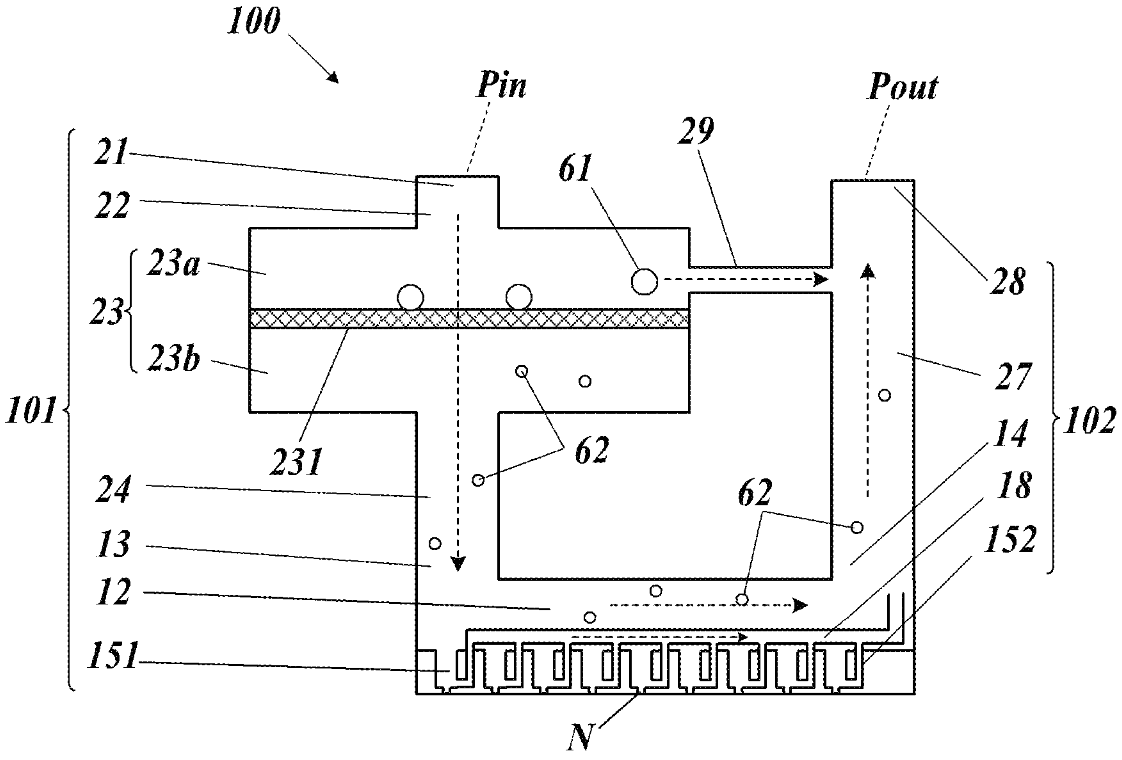
FIG. 10 This is a diagram schematically illustrating a channel of ink in a liquid droplet ejection head.

FIG. 10 is a diagram schematically illustrating the channel of ink in the liquid droplet ejection head 100.

As illustrated in FIG. 10, the pressure difference between the pressure Pin at the supply port 21 and the pressure Pout at the discharge port 28 generates a flow of ink from the supply port 21, through the front chamber 23*a* and rear chamber 23*b* of the liquid container 23, the second supply channel 24, the common supply channel 13, the common ink chamber 12, the first common discharge channel 14, and the discharge channel 27, to the discharge port 28. Also, the above pressure difference generates a flow of ink from the common ink chamber 12, through the ink channel 151, the individual discharge channels 152, and the second common discharge channel 18, to the discharge channel 27. Also, the above pressure difference generates a flow of ink from the front chamber 23*a* of the liquid container 23, through the communicating channel 29, to the discharge channel 27.

Of these, the flow rate of ink that flows through the first common discharge channel 14, the second common discharge channel 18, and the communicating channel 29, into the discharge channel 27 and is discharged from the discharge port 28 is hereinafter referred to as the circulation flow rate. The circulation flow rate is constant, regardless of the ejection status (ejection volume) of ink from the nozzles N.

The ejection volume of ink from the nozzles N increases or decreases depending on the content of the image to be formed. According to ink ejection from the nozzles N, ink equal to the volume ejected is supplied to the common ink chamber 12. Therefore, the greater the ejection volume of ink per unit time from the nozzles N is, the higher the flow rate of ink in the supply channel 101, or in other words the ink passing through the filter 231 becomes. Hereinafter, the flow rate of ink in the supply channel 101 that corresponds to the maximum ejection volume of ink per unit time from the nozzles N is referred to as the maximum ejection flow rate. Consequently, the maximum flow rate of ink passing through the supply channel 101 is the sum of the maximum ejection flow rate and the circulation flow rate.

Generally, the relation $Q=\Delta P/R$ holds, where Q [$m^3/s$] is the flow rate of ink flowing through the channel, $\Delta P$ [Pa] is the pressure difference (differential pressure) between the ends of the channel, and R [Pa·s/m$^3$] is the channel resistance. Also, if the channel is a circular duct and the flow of ink is laminar, the following Hagen-Poiseuille equation holds.

$$R=(128\cdot\mu\cdot L)/(\pi\cdot d^4)$$

where μ [Pa·s] is the viscosity of the ink, L [m] is the length of the channel, and d [m] is the diameter of the channel.

Gas bubbles 61 larger than the mesh diameter of the filter 231 are trapped by the filter 231 and remain in the front chamber 23*a*. These gas bubbles 61 may include gas bubbles that flow in from the supply port 21 in addition to gas bubbles created by dissolved gases in the ink due to pressure and temperature changes or the like. The gas bubbles 61 are guided with the ink through the communicating channel 29 to the discharge channel 27 and are discharged from the discharge port 28.

If the pressure loss in the filter 231, or in other words the pressure difference between the front chamber 23*a* and the rear chamber 23*b*, is equal to or greater than a certain pressure, the liquid surface (meniscus) of the gas bubbles 61 will rupture and split into smaller gas bubbles. The pressure difference at this time is referred to as the first meniscus break pressure (meniscus break pressure of the filter).

In the case in which the filter 231 is a through-hole filter, the first meniscus break pressure P1 [Pa] can be obtained by the relational expression P1=4σ/dt, where dt [m] is the aperture diameter of the through-holes of the filter 231 and σ [N/m] is the surface tension of the ink.

Also, in the case in which the filter 231 is a porous plate filter, the first meniscus break pressure P1 [Pa] can be obtained by the relational expression P1=4σ/da, where da is the value of the absolute filtration rating. Alternatively, the first meniscus break pressure can be obtained experimentally as follows. To be specific, when the rear chamber 23*b* of the filter 231 is filled with a liquid, the front chamber 23*a* is filled with air, and the front chamber 23*a* is pressurized, the pressure in the front chamber 23*a* at which the filter 231 breaks the meniscus can be measured to determine the first meniscus break pressure. In this case, the filter 231 breaking the meniscus refers to when gas bubbles begin to permeate (pass through) into the rear chamber 23*b*.

In the phenomenon whereby the meniscus of the gas bubbles 61 trapped in the filter 231 break (rupture) and gas bubbles pass through the filter 231, the gas bubbles after passing through the filter 231 may be larger than the mesh diameter of the filter 231 in some cases. This is because in this phenomenon, gas bubbles larger than the mesh diameter may deform to pass through the mesh of the filter 231, or a plurality of gas bubbles may unite after passing through the filter 231. If gas bubbles larger than the mesh diameter after passing through the filter 231 enter the ink channel 151 from the rear chamber 23*b*, there is a possibility that poor ejection of ink may occur.

Accordingly, the ink circulation mechanism 9 that serves as the liquid feeder of the present embodiment performs the liquid feeding operation in such a way as to meet a condition under which the gas bubbles 61 do not rupture in the filter 231. In other words, the ink circulation mechanism 9 performs the liquid feeding operation in such a way as to meet the condition (hereinafter referred to as a first condition) stipulating that "the pressure loss in the filter 231 is smaller than the first meniscus break pressure at which the meniscus of the liquid ruptures in the filter 231". The pressure Pin at the supply port 21 and the pressure Pout at the discharge port 28 are adjusted to meet this first condition. With this arrangement, the gas bubbles 61 stay in the front chamber 23*a* without rupturing and are discharged from the communicating channel 29.

Note that the first condition may also be met by adjusting the circulation flow rate of ink instead of the adjustment of the pressures Pin and Pout (or in addition to this adjustment). The circulation flow rate of ink can be adjusted by the shape of the channel, the area of the filter 231, and the like.

Also, if the range of increase or decrease of the pressure loss in the filter 231 is equal to or greater than the second meniscus break pressure, a pressure variation corresponding to the range of increase or decrease will occur in the meniscus m of the nozzle N, causing the meniscus m to break and gas bubbles to flow into the nozzle N. Here, the range of increase or decrease of the pressure loss that can occur in the filter 231 corresponds to the difference between the pressure loss when the ink ejection volume per unit time from the nozzle N is 0 and the pressure loss when the ink ejection volume per unit time is a maximum. Therefore, the range of increase or decrease of the pressure loss in the filter 231 is equal to the pressure loss that occurs in the filter 231 due to the ink at the maximum ejection flow rate described above.

Accordingly, the liquid droplet ejection device 1 of the present embodiment is configured to meet a condition (hereinafter referred to as a second condition) stipulating that "the pressure loss that occurs in the filter 231 due to the ink at the maximum ejection flow rate is smaller than the second meniscus break pressure". That is, the area and mesh diameter of the filter 231 are determined so that the second condition is met. In addition, the ink circulation mechanism 9 performs the liquid feeding operation in such a way as to meet the second condition.

Incidentally, some of the gas bubbles present in the front chamber 23*a* are smaller than the mesh diameter of the filter 231 to begin with. The gas bubbles 62 of such size can pass through the filter 231 and may flow into the rear chamber 23*b*, as illustrated in FIG. 10. A portion of the gas bubbles 62 flowing into the rear chamber 23*b* flows with the ink through the second supply channel 24, the common supply channel 13, the common ink chamber 12, the first common discharge channel 14, and the discharge channel 27, and are discharged from the discharge port 28. Also, some of the remaining portion of the gas bubbles 62 flows from the common ink chamber 12 to the ink channel 151, through the individual discharge channels 152 and the second common discharge channel 18, and into the discharge channel 27.

As illustrated in FIG. 7, in the ink channel 151, the ink flows vertically downward (−Z direction). That is, the ink channel 151, which is one part of the supply channel 101, corresponds to a descending portion where the liquid feeding direction has a vertically downward component. The ink circulation mechanism 9 performs the liquid feeding operation in such a way that the vertically downward component of the velocity of the ink in the ink channel 151 is greater than the velocity at which the gas bubbles 62 float upward by buoyant force. This arrangement causes the gas bubbles 62 to flow downward in the ink channel 151.

Additionally, the portion of the second supply channel 24 illustrated in FIG. 5A, where the ink flows downward, also corresponds to the descending portion described above. The ink circulation mechanism 9 performs the liquid feeding operation in such a way that the vertically downward component of the velocity of the ink in the corresponding portion of the second supply channel 24 is greater than the velocity at which the gas bubbles 62 float upward by buoyant force, so that the gas bubbles 62 in the corresponding portion flow downward. This arrangement causes the gas bubbles 62 to flow downward in the corresponding portion of the second supply channel 24.

Note that the descending portion is not limited to extending in the vertical direction and includes any portion where the liquid feeding direction has a vertically downward component.

As illustrated in FIG. 7, although the ink channel 151 is included in the flow path of the gas bubbles 62, poor ejection of ink from the nozzle N is unlikely even if gas bubbles 62 of a size that can pass through the filter 231 flow into the ink channel 151. This is because the mesh diameter of the filter 231 is smaller than the aperture diameter of the nozzle N, and therefore the gas bubbles 62 are smaller than the aperture diameter of the nozzle N.

In general, gas bubbles in the ink channel 151 give rise to poor ejection because the gas bubbles absorb the pressure wave that the pressure varying means has generated inside the ink channel 151. Here, the smaller the aperture diameter of the nozzle N is, the greater the energy required for ink ejection is, and thus small gas bubbles can easily lead to poor ejection. More specifically, simulation results show that poor ejection occurs when the size of gas bubbles is equal to or greater than the aperture diameter of the nozzle N, and that gas bubbles smaller than the aperture diameter of the nozzle N are unlikely to lead to poor ejection.

In this way, in the liquid droplet ejection head 100 of the present embodiment, even if the gas bubbles 62 smaller than the aperture diameter of the nozzle N flow into the ink channel 151, poor ejection caused by these gas bubbles 62 is unlikely to occur. By utilizing this result and increasing the mesh diameter of the filter 231 somewhat, pressure loss in the liquid droplet ejection head 100 as a whole can be reduced while also suppressing the occurrence of poor ejection. From this standpoint, the mesh diameter of the filter 231 is, for example, preferably set to be equal to or greater than ⅓ the aperture diameter of the nozzle N, more preferably set to be equal to or greater than ½ the aperture diameter of the nozzle N.

<Effects>

As above, the liquid droplet ejection device 1 according to the present embodiment is provided with the liquid droplet ejection head 100 and the ink circulation mechanism 9 that serves as a liquid feeder. The liquid droplet ejection head 100 includes the nozzles N that eject ink, the supply channel 101 through which ink to be supplied to the nozzles N runs, the discharge channel 102 which communicates with the supply channel 101 and through which ink to be discharged without being ejected from the nozzles N runs, the filter 231 which is provided in the supply channel 101 and through which ink running through the supply channel 101 passes, and the communicating channel 29 that branches off from the supply channel 101 on the upstream side of the filter 231 in the liquid feeding direction of the ink and communicates with the discharge channel 102. The mesh diameter of the filter 231 is smaller than the aperture diameter of the nozzles N, and the ink circulation mechanism 9 performs the liquid feeding operation in such a way that the pressure loss in the filter 231 is smaller than the first meniscus break pressure at which the meniscus of the ink ruptures in the filter 231.

With this arrangement, gas bubbles of a size at least equal to or greater than the aperture diameter of the nozzles N can be captured by the filter 231, and these gas bubbles can be discharged to the outside via the communicating channel 29 and the discharge channel 102.

Moreover, since the pressure loss in the filter 231 can be made smaller than the first meniscus break pressure, the gas bubbles captured in the filter 231 do not rupture easily. Therefore, the captured gas bubbles can be discharged efficiently from the communicating channel 29, and it is possible to suppress the occurrence of poor ejection of ink due to the gas bubbles rupturing and flowing into the ink channel 151.

Also, by allowing some gas bubbles smaller than the aperture diameter of the nozzles N (the gas bubbles 62 smaller than the mesh diameter of the filter 231) to pass through the filter 231, it is possible to lower the channel resistance of the supply channel 101. With this arrangement, the pressure loss in the liquid droplet ejection head 100 as a whole, that is, the difference between the pressure of the ink at the supply port 21 and the pressure of the ink at the nozzles N, can be kept small, and large gas bubbles that would lead to poor ejection (gas bubbles larger than the aperture diameter of the nozzles N) can be discharged to the outside and kept from flowing into the ink channel 151.

Also, provided that the maximum ejection flow rate is the flow rate of ink in the supply channel 101 that corresponds to the maximum ejection volume of ink per unit time from the nozzles N, the pressure loss that occurs in the filter 231 due to the ink at the maximum ejection flow rate is smaller than the second meniscus break pressure at which the meniscus of the ink ruptures in the nozzles N.

With this arrangement, even if the ink ejection volume of ink from the nozzles N varies, rupturing of the meniscus m in the nozzles N due to such variation can be suppressed. Therefore, it is possible to suppress the occurrence of poor ejection caused by gas bubbles flowing in from nozzles N.

In addition, the supply channel 101 includes the ink channel 151 as a descending portion where the liquid feeding direction has a vertically downward component, and the ink circulation mechanism 9 performs the liquid feeding operation in such a way that the vertically downward component of the velocity of the ink in the ink channel 151 is greater than the velocity at which the gas bubbles 62 smaller than the aperture diameter of the nozzles N float upward by buoyant force.

With this arrangement, the gas bubbles inside the ink channel 151 can be made to flow downward against the buoyant force and be discharged from the individual discharge channels 152.

Also, the nozzle N has a tapered part Nt in which the cross-sectional area perpendicular to the ink ejection direction decreases closer to the aperture of the nozzle N.

By including the tapered part Nt in the nozzle N, the energy required to eject ink can be reduced. Therefore, it is possible to lower the likelihood of poor ejection caused by the inflow of gas bubbles into the ink channel 151.

Also, in the present embodiment, a water-based ink is used. In water-based inks, dissolved gases tend to bubble out at higher pressures compared to solvent inks and the like, and gas bubbles are easily generated by cavitation (the state of negative pressure inside the ink channel 151 after ink ejection). Accordingly, in the case of applying a water-based ink to the liquid droplet ejection device 1 of the present embodiment, the occurrence of defects caused by gas bubbles can be suppressed effectively.

Also, the liquid feeding direction according to the present embodiment includes a liquid feeding step that causes ink in the supply channel 101 and the discharge channel 102 to flow in a liquid feeding direction, wherein in the liquid feeding step, the ink is made to flow in such a way that the pressure loss in the filter 231 is smaller than the first meniscus break pressure at which the meniscus of the ink ruptures in the filter 231.

With this arrangement, the pressure loss in the liquid droplet ejection head 100 as a whole can be kept small, and large gas bubbles that would lead to poor ejection can be discharged to the outside and kept from flowing into the ink channel 151.

EXAMPLES

Next, experiments that were performed to confirm the effects of the above embodiment will be described.

FIG. 11 is a table showing the details and results of the experiments.

A total of 11 experiments from Experiment 1 to Experiment 11 were conducted.

In each of the experiments, at least one from among the mesh diameter, aperture ratio, and area of the filter 231, the aperture diameter of the nozzles N, and the maximum ejection flow rate were different from each other.

Of these, the mesh diameter, aperture ratio, and area of the filter 231 were changed to adjust the level of channel resistance, pressure loss (a1), pressure loss (a2), and first meniscus break pressure (b) (denoted "MB pressure" in the table) of the filter. Here, the pressure loss (a1) is the pressure loss that occurs due to ink at the maximum flow rate obtained by combining the circulation flow rate and the maximum ejection flow rate, of which the pressure loss (a2) is the pressure loss that occurs due to ink at the maximum ejection flow rate. The pressure loss (a1) and the pressure loss (a2) were calculated from the calculated value of the channel resistance. Also, a porous plate filter was used as the filter 231, and the first meniscus break pressure (b) was obtained by calculation.

Also, the aperture diameter of the nozzles N was changed at the two levels of 40 [μm] and 20 [μm] to adjust the level of the second meniscus break pressure (c).

Also, the ink circulation flow rate was set to the two levels of 90 [ml/min] and 20 [ml/min], and the maximum ejection flow rate was set to the two levels of 80 and 60 [ml/min].

Through combinations of the above, the maximum flow rate combining the circulation flow rate and the maximum ejection flow rate was set to the three levels of 170 [ml/min], 150 [ml/min], and 80 [ml/min].

Note that the parameters common to Experiments 1 to 11 are as follows.

Filter thickness: 100 [μm]

Ink viscosity: 0.01 [Pa·s]

Ink surface tension: 30 [mN/m]

Nozzle N taper angle: 8 [deg]

Type of ink: water-based ink

In each of the experiments, continuous ejection from the nozzles N was performed for 10 minutes at the maximum ejection volume, and the presence or absence of defects due to non-ejection of ink from the nozzles N was determined. In the "Continuous ejection evaluation result" column in FIG. 11, a "circle" indicates that defects did not occur, and a "cross mark" indicates the defects occurred. Defects in the continuous ejection evaluation mainly occur because the gas bubbles 61 in the front chamber 23*a* rupture and small gas bubbles 62 flow into the ink channel 151.

Also, in each of the experiments, intermittent ejection was performed for 10 minutes by switching the ejection volume from the nozzles N between minimum (OFF) and maximum (ON) at 0.5 second intervals, and the presence or absence of defects due to non-ejection of ink from the nozzles N was determined. In the "Intermittent ejection evaluation result" column in FIG. 11, a "circle" indicates that defects did not occur, and a "cross mark" indicates the defects occurred. Defects in the intermittent ejection evaluation mainly occur because of rupturing of the meniscus m of the nozzles N due to a variation in pressure loss.

The results of the experiments show that a "circle" continuous ejection evaluation result was obtained in Experiments 2-4, 6, 7, and 9-11 that meet the condition (corresponding to the first condition described above) that "the pressure loss (a1) of the filter 231 is smaller than the first meniscus break pressure (b)". Also, a "cross mark" continuous ejection evaluation result was obtained in Experiments 1, 5, and 8 that do not meet the first condition.

Also, a "circle" intermittent ejection evaluation result was obtained in Experiments 2-4, 6, 7, 10, and 11 that meet the condition (corresponding to the second condition described above) that "the pressure loss (a2) that occurs in the filter 231 due to the ink at the maximum ejection flow rate is smaller than the second meniscus break pressure (c)". Also, a "cross mark" intermittent ejection evaluation result was obtained in Experiments 1, 5, 8, and 9 that do not meet the second condition.

<Modification>

Next, a modification of the liquid droplet ejection device 1 will be described.

Figure 12:
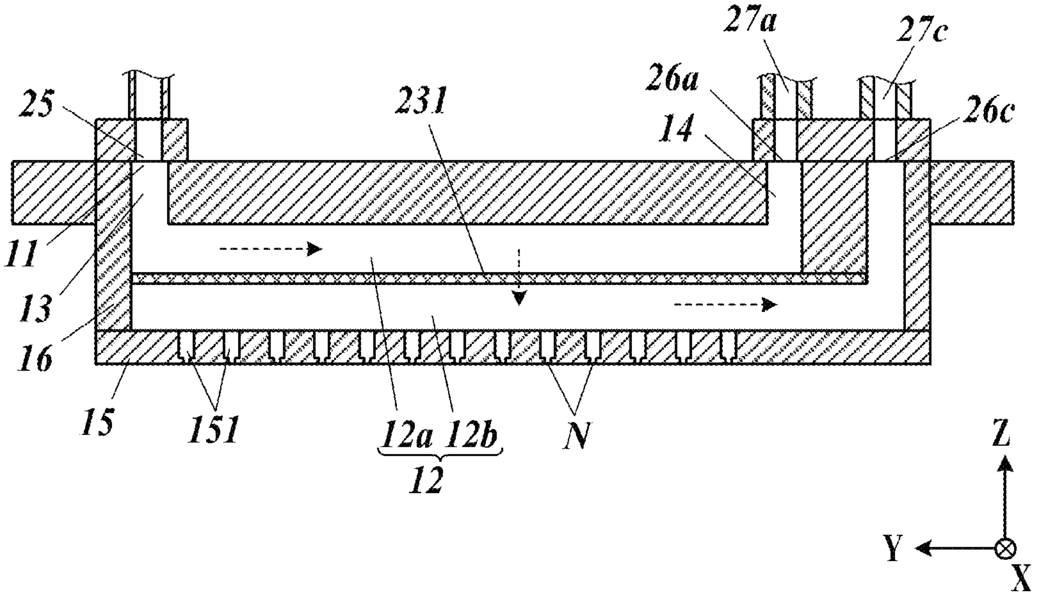
FIG. 12 This is a cross section for explaining an ink channel in a liquid droplet ejection head according to a modification.

FIG. 12 is a cross section for explaining the ink channel in the liquid droplet ejection head 100 according to the modification.

In the liquid droplet ejection head 100 of the modification, the common ink chamber 12 has an upper layer 12*a* and a lower layer 12*b* located on the −Z direction side of the upper layer 12*a*. Also, the upper layer 12*a* and the lower layer 12*b* are partitioned by a filter 231 parallel to the XY plane. In this way, the filter 231 may be provided outside the liquid storage tank 20.

The upper layer 12*a* leads to the first common discharge channel 14, inflow port 26*a*, and discharge channel 27*a* described above. Also, the lower layer 12*b* leads to an inflow port 26*c* provided separately from the inflow ports 26*a* and 26*b*, and also leads to a discharge channel 27*c* provided separately from the discharge channels 27*a* and 27*b*. The discharge channel 27*c* converges with the discharge channels 27*a*, 27*b* and also communicates with the discharge port 28.

Ink running from the ink inflow port 11 to the common supply channel 13 first flows into the upper layer 12*a* of the common ink chamber 12. Some of the ink in the upper layer 12*a* flows together with gas bubbles and foreign matter through the first common discharge channel 14, the inflow port 26*a*, and the discharge channel 27*a*, and is discharged from the discharge port 28. In this modification, the portion from the first common discharge channel 14 to the discharge channel 27*a* corresponds to a "communicating channel" and functions as a degassing channel.

Also, some of the ink in the upper layer 12*a* passes through the filter 231 and flows into the lower layer 12*b*. Some of the ink in the lower layer 12*b* flows into the ink channel 151, of which a portion is ejected from the nozzles N while the remainder flows through the individual discharge channels 152, the second common discharge channel 18, the inflow port 26*b*, and the discharge channel 27*b*, and is discharged from the discharge port 28. Also, the portion of the ink in the lower layer 12*b* that did not flow into the ink channel 151 flows through the inflow port 26*c* and the discharge channel 27*c* and is discharged from the discharge port 28.

According to the configuration of this modification, too, the pressure loss in the liquid droplet ejection head 100 as a whole can be kept small, and large gas bubbles that would lead to poor ejection can be discharged to the outside and kept from flowing into the ink channel 151.

<Other>

Note that the present invention is not limited to the above embodiment and modification and may be subject to various changes.

For example, the liquid droplet ejection head 100 may eject a liquid other than ink, such as a functional liquid for forming circuit patterns and the like on a recording medium, for example.

Also, a communicating channel that branches off from the rear chamber 23*b* and communicates with the discharge channel 27 may be further provided, in addition to the communicating channel 29 that branches off from the front chamber 23*a*.

Also, a shear-mode liquid droplet ejection head 100 is illustrated as an example, but the configuration is not limited thereto. For example, a vent-mode liquid droplet ejection head 100 may also be used, in which ink is ejected by varying the pressure of the ink inside a pressure chamber connected to a nozzle by deforming a piezoelectric element (pressure varying means) affixed to the wall of the pressure chamber. In this case, individual discharge channels can be branched off from any location in the range from the pressure chamber to the nozzle.

Also, a channel including the individual discharge channels 152 branching off from the ink channel 151 and the second common discharge channel 18 that communicates with the individual discharge channels 152 is illustrated as an example of the discharge channel 102, but the configuration is not limited thereto, and the individual discharge channels 152 and second common discharge channel 18 may also be omitted.

Moreover, although a single-pass liquid droplet ejection device 1 is described as an example, the present invention may also be applied to a liquid droplet ejection device that records an image while scanning the head unit or the liquid droplet ejection head.

Moreover, the description uses the example of conveying the recording medium M with the conveyor belt 2*c* but is not intended to be limited thereto, and for example, the recording medium M may also be held and conveyed on the outer circumferential surface of a rotating conveyor drum.

Several embodiments of the present invention have been described, but the scope of the present invention is not limited to the embodiments described above and includes the scope of the invention as described in the claims and equivalents thereof.

INDUSTRIAL APPLICABILITY

The present invention can be used with a liquid droplet ejection device and a liquid feeding method.

REFERENCE SIGNS LIST

1 Liquid droplet ejection device
2 Conveyor
3 Head unit
9 Ink circulation mechanism
10 Ejection actuator
11 Ink inflow port
12 Common ink chamber
13 Common supply channel
14 First common discharge channel
15 Ink channel
15*a* Nozzle plate
15*b* Channel substrate
15*c* Pressure chamber substrate
151 Ink channel
152 Individual discharge channel
16 Ink manifold
17, 17*a*, 17*b* Ink outflow port
18 Second common discharge channel
20 Liquid storage tank
20*a* Main body
21 Supply port
22 First supply channel
23 Liquid container
23*a* Front chamber
23*b* Rear chamber
231 Filter
232, 233, 234 Open end
24 Second supply channel
25 Outflow port
26, 26*a* to 26*c* Inflow port
27, 27*a* to 27*c* Discharge channel
271 Check valve
28 Discharge port
29 Communicating channel
30 Cover member
40 Controller
61, 62 Gas bubbles
100 Liquid droplet ejection head
100*a* Nozzle aperture surface
101 Supply channel
102 Discharge channel
M Recording medium
N Nozzle
Ns Straight part
Nt Tapered part
m Meniscus

The invention claimed is:

1. A liquid droplet ejection device comprising:
a liquid droplet ejection head including
a nozzle that ejects a liquid,
a supply channel through which the liquid to be supplied to the nozzle runs,
a discharge channel which communicates with the supply channel and through which the liquid to be discharged without being ejected from the nozzle runs,
a filter which is provided in the supply channel and through which the liquid running through the supply channel passes, and
a communicating channel that branches off from the supply channel on an upstream side of the filter in a liquid feeding direction of the liquid and communicates with the discharge channel; and
a liquid feeder that performs a liquid feeding operation causing the liquid in the supply channel and the discharge channel to flow in the liquid feeding direction,
wherein
a mesh diameter of the filter is smaller than an aperture diameter of the nozzle,
the liquid feeder performs the liquid feeding operation in such a way that a pressure loss in the filter is smaller than a first meniscus break pressure at which a meniscus of the liquid ruptures in the filter,
the supply channel has a descending portion where the liquid feeding direction has a vertically downward component, and the liquid feeder performs the liquid feeding operation in such a way that the vertically downward component of a velocity of the liquid in the descending portion is greater than a velocity at which gas bubbles smaller than the aperture diameter of the nozzle float upward by buoyant force.

2. The liquid droplet ejection device according to claim 1, wherein provided that a maximum ejection flow rate is a flow rate of the liquid in the supply channel that corresponds to a maximum ejection volume of the liquid per unit time from the nozzle, a pressure loss that occurs in the filter due to the liquid at the maximum ejection flow rate is smaller than a second meniscus break pressure at which a meniscus of the liquid ruptures in the nozzle.

3. The liquid droplet ejection device according to claim 1, wherein the nozzle has a tapered part in which the cross-sectional area perpendicular to the ejection direction of the liquid decreases closer to the aperture of the nozzle.

4. The liquid droplet ejection device according to claim 1, wherein the liquid is a water-based ink.

5. A liquid feeding method in a liquid droplet ejection device provided with a liquid ejector including a nozzle that ejects a liquid, a supply channel through which the liquid to be supplied to the nozzle runs, a discharge channel which communicates with the supply channel and through which the liquid to be discharged without being ejected from the nozzle runs, a filter which is provided in the supply channel and through which the liquid running through the supply channel passes, a communicating channel that branches off from the supply channel on an upstream side of the filter in a liquid feeding direction of the liquid and communicates with the discharge channel, and a liquid feeder that performs a liquid feeding operation causing the liquid in the supply channel and the discharge channel to flow in the liquid feeding direction, wherein a mesh diameter of the filter is smaller than an aperture diameter of the nozzle, the liquid feeding method comprising:

a liquid feeding step that causes the liquid in the supply channel and the discharge channel to flow in the liquid feeding direction, wherein in the liquid feeding step, the liquid is caused to flow in such a way that a pressure loss in the filter is smaller than a first meniscus break pressure at which a meniscus of the liquid ruptures in the filter, wherein the supply channel has a descending portion where the liquid feeding direction has a vertically downward component, and the liquid feeder performs the liquid feeding operation in such a way that the vertically downward component of a velocity of the liquid in the descending portion is greater than a velocity at which gas bubbles smaller than the aperture diameter of the nozzle float upward by buoyant force.

* * * * *